(12) United States Patent
Sakamoto

(10) Patent No.: US 10,642,030 B2
(45) Date of Patent: May 5, 2020

(54) ZOOM LENS AND IMAGE PICKUP APPARATUS INCLUDING THE SAME

(71) Applicant: CANON KABUSHIKI KAISHA, Tokyo (JP)

(72) Inventor: Masaru Sakamoto, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 1 day.

(21) Appl. No.: 15/963,521

(22) Filed: Apr. 26, 2018

(65) Prior Publication Data

US 2018/0314060 A1 Nov. 1, 2018

(30) Foreign Application Priority Data

May 1, 2017 (JP) ................................ 2017-091070

(51) Int. Cl.
*G02B 15/177* (2006.01)
*G02B 27/00* (2006.01)
(Continued)

(52) U.S. Cl.
CPC ........... *G02B 27/005* (2013.01); *G02B 13/02* (2013.01); *G02B 15/145523* (2019.08); *G02B 15/177* (2013.01); *G02B 15/20* (2013.01)

(58) Field of Classification Search
CPC ........ G02B 15/1435; G02B 15/143503; G02B 15/143507; G02B 15/144503; G02B 15/144507; G02B 15/144511; G02B 15/144515; G02B 15/1455; G02B 15/145503; G02B 15/145507; G02B 15/145511; G02B 15/145515;
(Continued)

(56) References Cited

U.S. PATENT DOCUMENTS

2010/0165476 A1* 7/2010 Eguchi ................ G02B 13/04
359/680
2015/0234165 A1 8/2015 Sakamoto
(Continued)

FOREIGN PATENT DOCUMENTS

JP 2010-8809 A 1/2010
JP 2010-54668 A 3/2010
(Continued)

*Primary Examiner* — Darryl J Collins
(74) *Attorney, Agent, or Firm* — Carter, DeLuca & Farrell LLP

(57) ABSTRACT

Provided is a zoom lens including, in order from an object side to an image side: a first lens unit having a negative refractive power and configured not to move for zooming; a second lens unit having a positive refractive power and configured to move to an object side for zooming from a wide angle end to a telephoto end; and a rear lens unit arranged closest to the image side, wherein the rear lens unit includes an optical element having a positive refractive power and cemented with a lens made of a glass material, and wherein the optical element satisfies the following conditions:

$-2.100\times10^{-3}\times vdm+0.693 < \theta gFm$; and $0.555 < \theta gFm < 0.900$, where vdm and θgFm are expressed by the following expressions:

$vdm = (Nd-1)/(NF-NC)$; and $\theta gFm = (Ng-NF)/(NF-NC)$, where Ng, NF, Nd and NC respectively represent refractive indices with respect to a g-line, an F-line, a d-line, and C-line.

8 Claims, 10 Drawing Sheets

(51) Int. Cl.
*G02B 13/02* (2006.01)
*G02B 15/20* (2006.01)
*G02B 15/14* (2006.01)

(58) Field of Classification Search
CPC .... G02B 15/145519; G02B 15/145523; G02B 15/145527; G02B 15/145531; G02B 15/1465
See application file for complete search history.

(56) References Cited

U.S. PATENT DOCUMENTS

| | | |
|---|---|---|
| 2016/0062092 A1 | 3/2016 | Sakamoto |
| 2016/0154224 A1* | 6/2016 | Imai ................. G02B 15/177 359/680 |
| 2017/0108680 A1* | 4/2017 | Kikuchi ............ G02B 15/177 |
| 2018/0143412 A1 | 5/2018 | Sakamoto et al. |
| 2018/0203214 A1 | 7/2018 | Sakamoto |

FOREIGN PATENT DOCUMENTS

| | | |
|---|---|---|
| JP | 2010-156762 A | 7/2010 |
| JP | 2015-34858 A | 2/2015 |

* cited by examiner

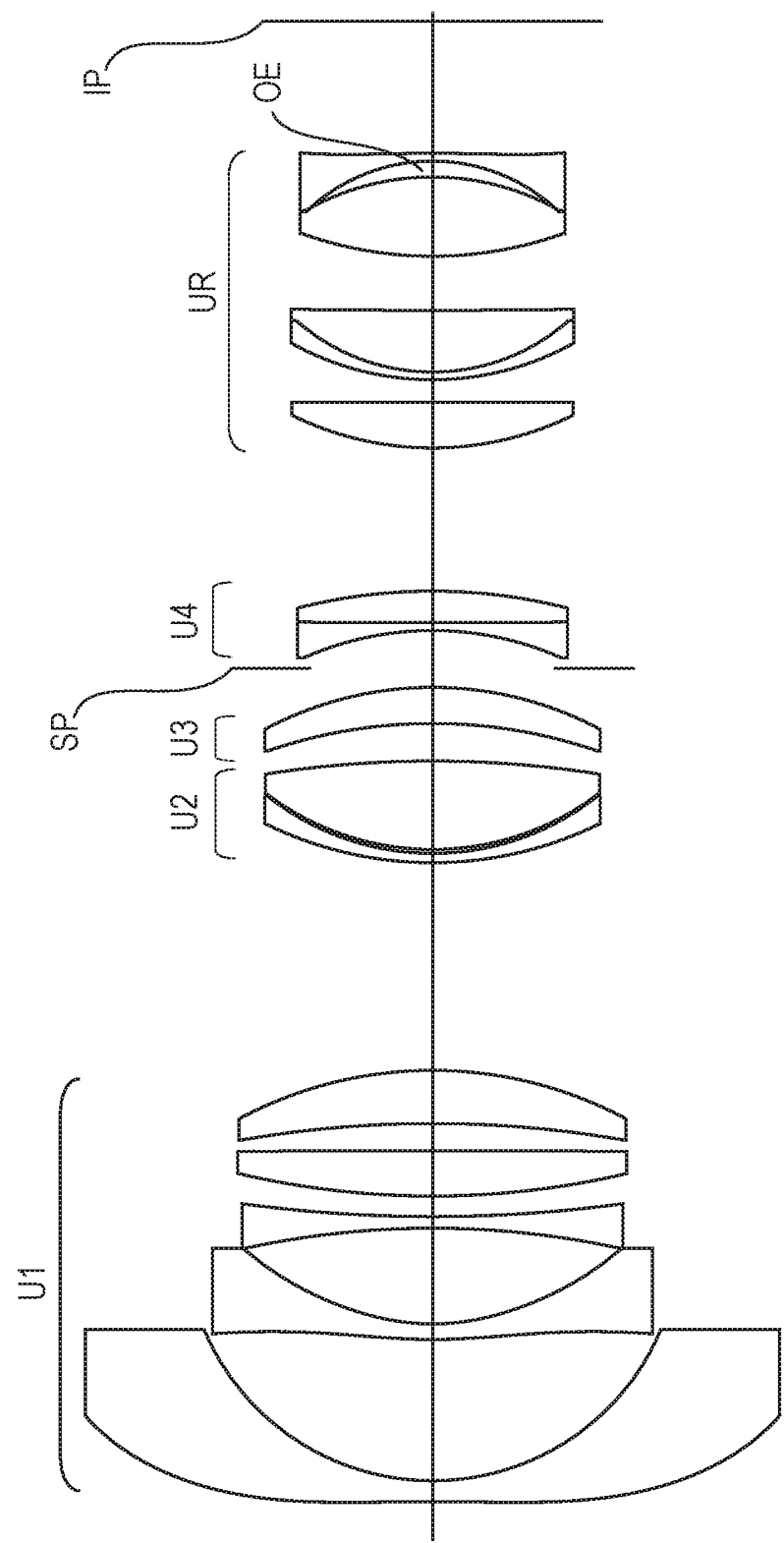

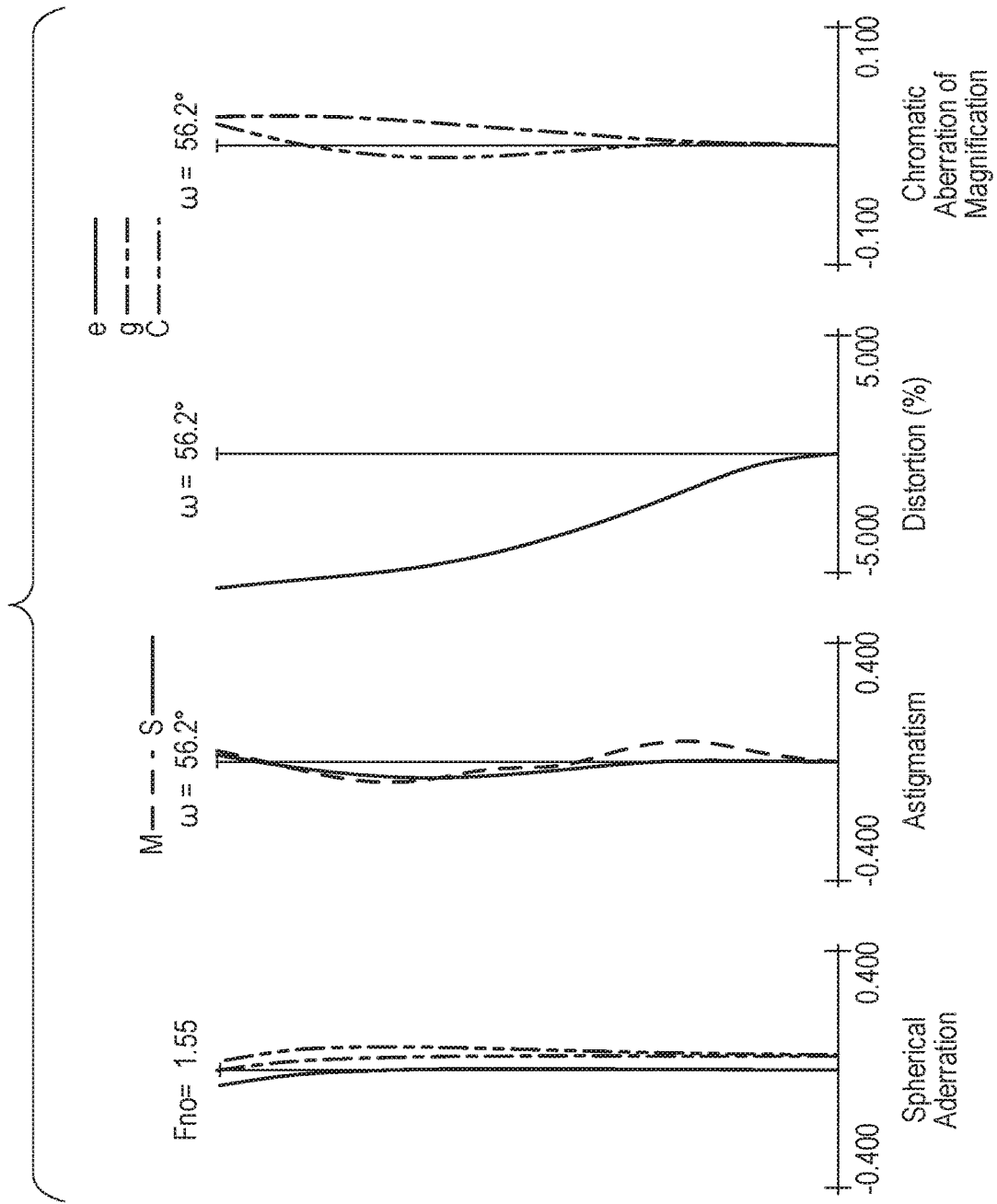

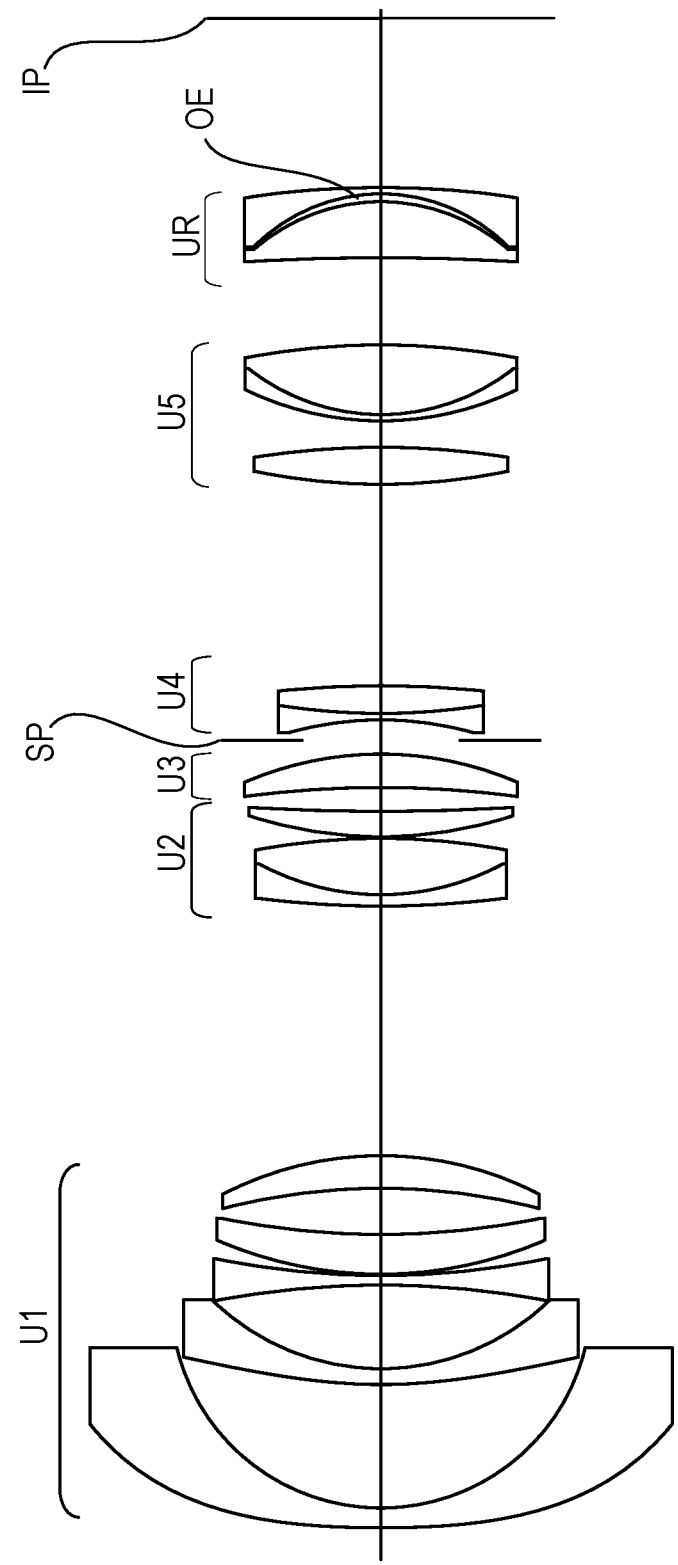

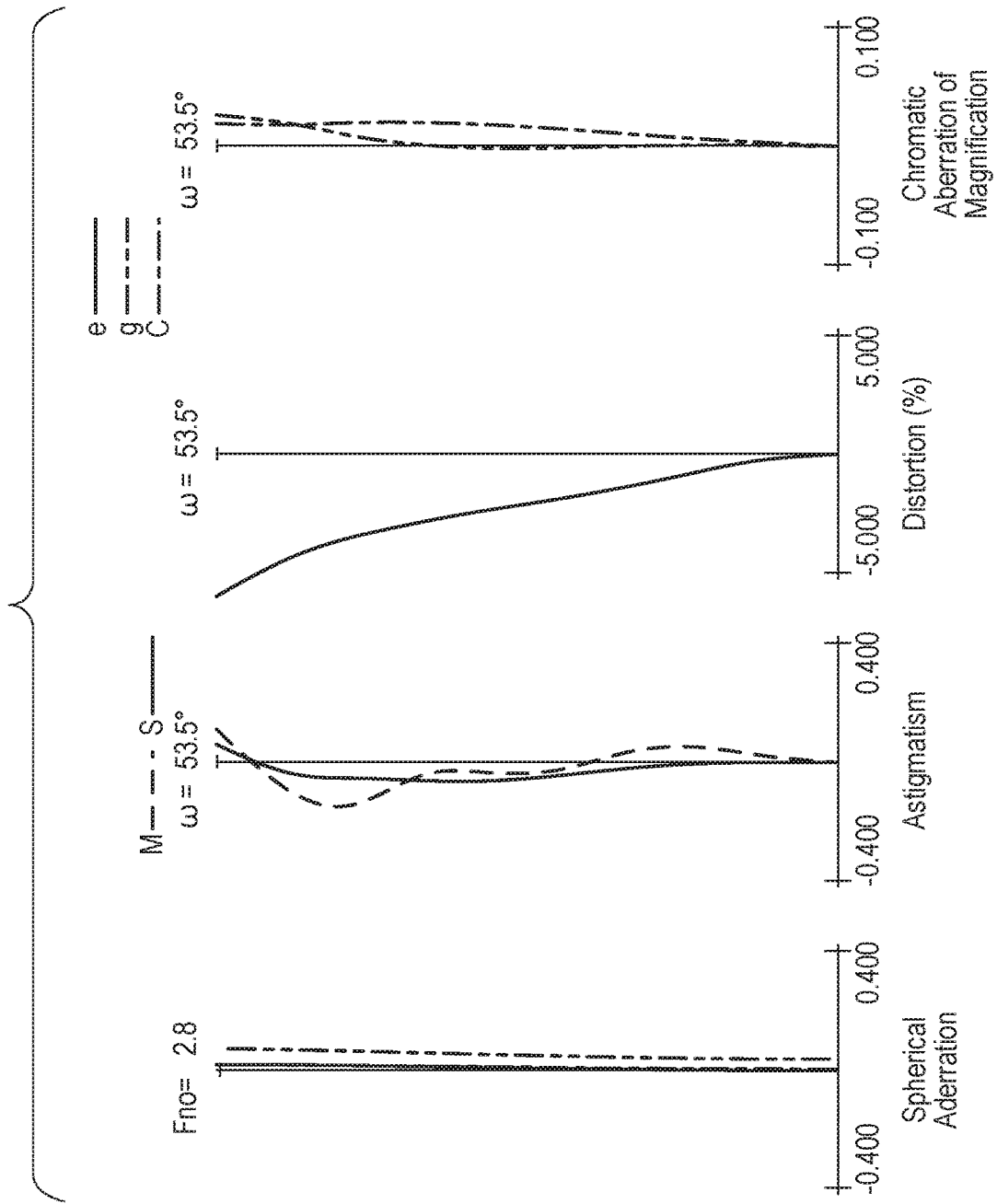

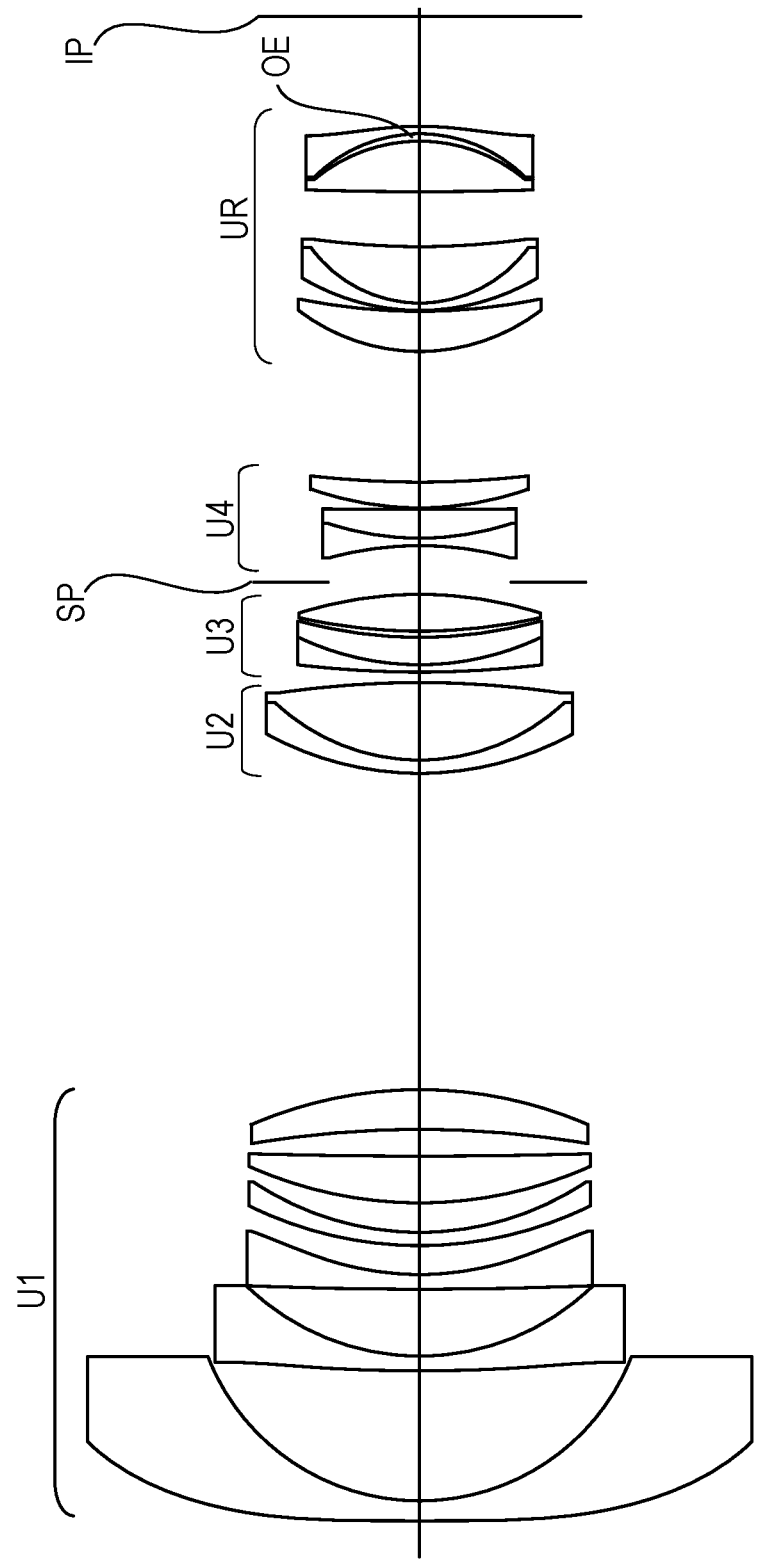

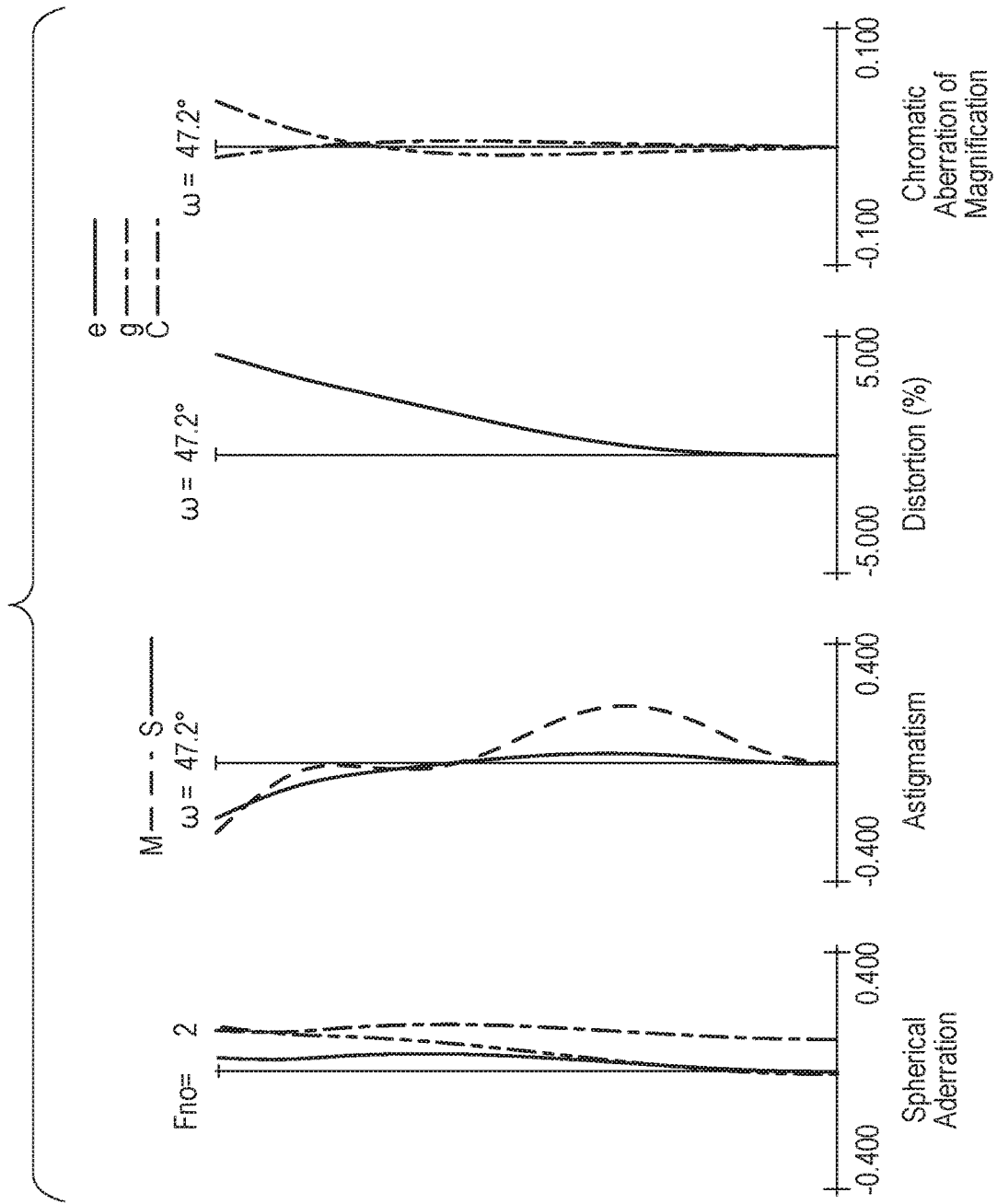

ZOOM LENS AND IMAGE PICKUP APPARATUS INCLUDING THE SAME

BACKGROUND OF THE INVENTION

Field of the Invention

The present invention relates to a zoom lens and an image pickup apparatus including the zoom lens, and more particularly, to a zoom lens suited for use in a broadcasting television camera, a cinema camera, a video camera, a digital still camera, and a silver-halide film camera.

Description of the Related Art

In recent years, a zoom lens having a small size, a light weight, a wide angle of view, and high optical performance is desired for use in an image pickup apparatus, for example, a television camera, a cinema camera, a photographic camera, or a video camera. Meanwhile, when a wide angle lens having a short focal length at a wide angle end is used, a wide range may be photographed, and perspective may be enhanced. Among users who want to utilize the photographing effect, there is an increased demand for a wide angle zoom lens having a wider angle, a small size, a light weight, and high performance.

Further, an image pickup device, for example, a charge coupled device (CCD) or a complementary metal oxide semiconductor (CMOS), which is used in a television or cinema camera serving as a professional moving image pickup system, has a substantially uniform resolution over the entire image pickup range. Therefore, a zoom lens using the image pickup device is required to have a substantially uniform resolution from the center to the periphery of the screen.

As the wide angle zoom lens, there is known a zoom lens of a negative lead type including a lens unit having a negative refractive power and a lens unit having a positive refractive power in order from the object side.

For example, in Japanese Patent Application Laid-Open No. 2015-34858, there is disclosed a zoom lens having an f-number at a wide angle end being from about 2.6 to about 4, an angle of view at the wide angle end being from about 80 to about 120, and a zooming ratio being from about 1.5 to about 4.

Generally, in the case of widening the angle in the zoom lens, a second-order spectrum of chromatic aberration of magnification is often generated on the wide angle side, and it becomes difficult to satisfactorily correct this spectrum.

In contrast, when a lens made of a material having extraordinary dispersibility is used in the optical system, the generation of the chromatic aberration can be reduced on the wide angle side due to the extraordinary dispersion effect of that lens.

However, even when the lens made of the material having extraordinary dispersibility is simply provided in the optical path, it is difficult to correct the chromatic aberration throughout the entire zoom range while widening the angle of view, to thereby enhance the image quality.

In order to correct the chromatic aberration throughout the entire zoom range while widening the angle of view to obtain high optical performance, it is important to appropriately set the position of a lens made of an anomalous partial dispersion material in the optical system, the refractive power of that lens, and the like.

In particular, in a zoom lens of retro-focus type in which a lens unit having a negative refractive power precedes, the arrangement of the lens units is asymmetrical with respect to an aperture stop, and hence how to use the lens made of the anomalous partial dispersion material is important.

The zoom lens disclosed in Japanese Patent Application Laid-Open No. 2015-34858 has achieved high performance despite having a compact entire system, but the chromatic aberration of magnification tends to become larger at the wide angle end.

SUMMARY OF THE INVENTION

It is an object of the present invention to provide a zoom lens capable of satisfactorily correcting various aberrations including chromatic aberration throughout the entire zoom range and having high optical performance, and to provide an optical apparatus including the zoom lens.

In order to achieve the above-mentioned object, according to one embodiment of the present invention, there is provided a zoom lens including, in order from an object side to an image side: a first lens unit having a negative refractive power and configured not to move for zooming; a second lens unit having a positive refractive power and configured to move to an object side for zooming from a wide angle end to a telephoto end; and a rear lens unit arranged closest to the image side, wherein the rear lens unit includes an optical element having a positive refractive power and cemented with a lens made of a glass material, and wherein the optical element satisfies the following conditions:

$$-2.100 \times 10^{-3} \times \nu dm + 0.693 < \theta gFm;\ \text{and}$$

$$0.555 < \theta gFm < 0.900,$$

where $\nu dm$ and $\theta gFm$ are expressed by the following expressions:

$$\nu dm = (Nd-1)/(NF-NC);\ \text{and}$$

$$\theta gFm = (Ng-NF)/(NF-NC),$$

where Ng, NF, Nd and NC respectively represent refractive indices with respect to a g-line, an F-line, a d-line, and C-line.

Further features of the present invention will become apparent from the following description of exemplary embodiments with reference to the attached drawings.

According to the present invention, it is possible to obtain a zoom lens having a wide angle of view, which is capable of satisfactorily correcting various aberrations including chromatic aberration throughout the entire zoom range, and has high optical performance.

BRIEF DESCRIPTION OF THE DRAWINGS

FIG. 1 is a lens cross-sectional view of a zoom lens according to Embodiment 1 of the present invention when focusing on an object at infinity at a wide angle end.

FIG. 2A is an aberration diagram of the zoom lens according to Embodiment 1 when focusing on an object at infinity at the wide angle end.

FIG. 3 is a lens cross-sectional view of a zoom lens according to Embodiment 2 of the present invention when focusing on an object at infinity at a wide angle end.

FIG. 4A is an aberration diagram of the zoom lens according to Embodiment 2 when focusing on an object at infinity at the wide angle end.

FIG. 5 is a lens cross-sectional view of a zoom lens according to Embodiment 3 of the present invention when focusing on an object at infinity at a wide angle end.

FIG. 6B is an aberration diagram of the zoom lens according to Embodiment 3 when focusing on an object at infinity at a telephoto end.

DESCRIPTION OF THE EMBODIMENTS

Figure 2B:
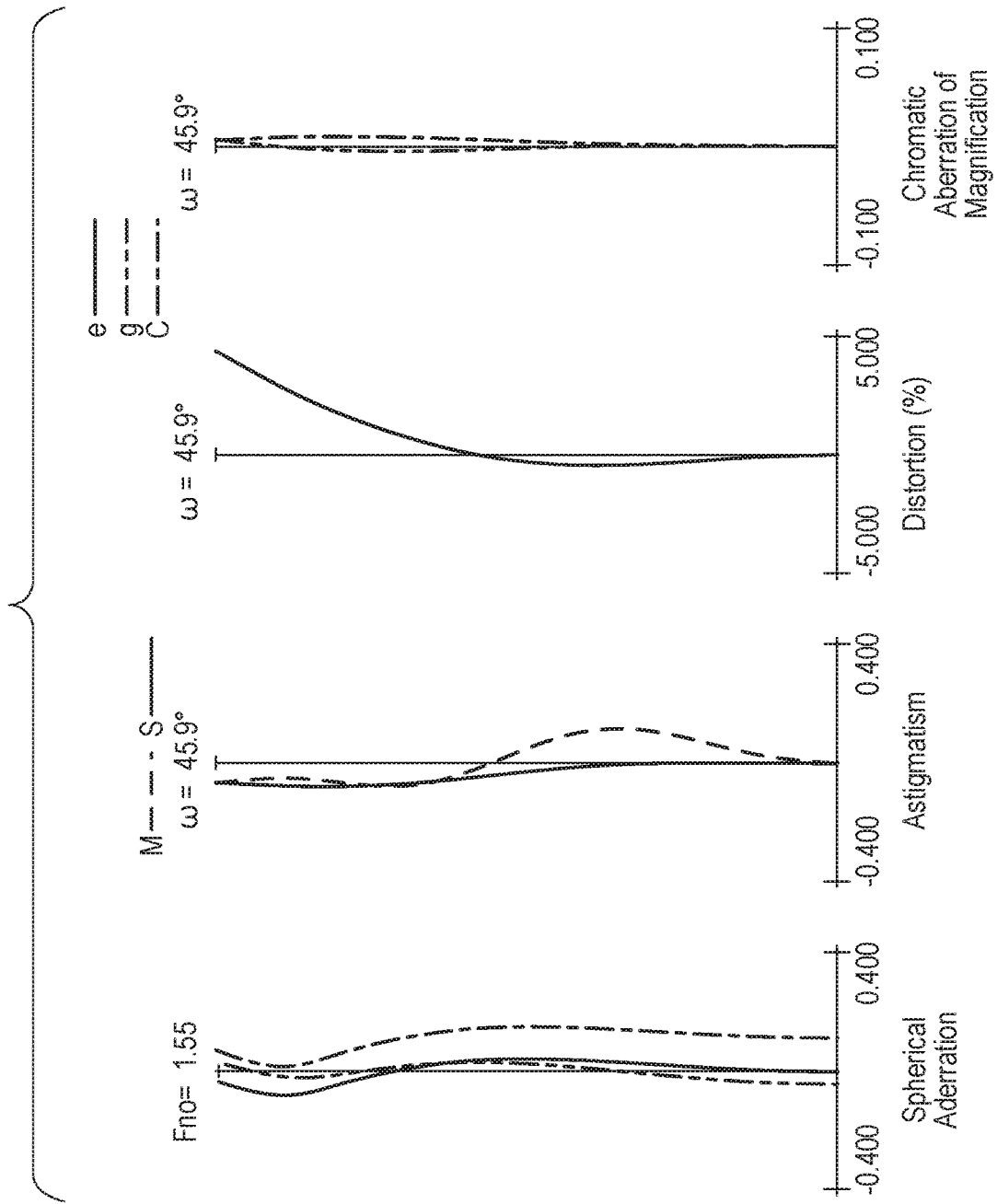
FIG. 2B is an aberration diagram of the zoom lens according to Embodiment 1 when focusing on an object at infinity at a telephoto end.

Preferred embodiments of the present invention will now be described in detail in accordance with the accompanying drawings.

The zoom lens according to one embodiment of the present invention includes, in order from an object side to an image side: a first lens unit having a negative refractive power and configured not to move for zooming; a second lens unit having a positive refractive power and configured to move for zooming from a wide angle end to a telephoto end; and a rear lens unit arranged closest to the image side and configured not to move for zooming. The zoom lens is configured such that an interval between adjacent lens units changes for zooming. The rear lens unit includes at least one optical element OE satisfying the following conditional expressions:

$$-2.100\times10^{-3}\times\nu dm+0.693<\theta gFm \quad (1); \text{ and}$$

$$0.555<\theta gFm<0.900 \quad (2),$$

where, when refractive indices with respect to a g-line, an F-line, a d-line, and a C-line of the Fraunhofer lines of the optical element OE are represented by Ng, NF, Nd, and NC, respectively, νdm and θgFm are expressed by the following expressions:

$$\nu dm=(Nd-1)/(NF-NC); \text{ and}$$

$$\theta gFm=(Ng-NF)/(NF-NC).$$

In the zoom lens according to one embodiment of the present invention, the above-mentioned lens configuration and characteristics of the optical element OE included in the lens unit arranged closest to the image side are defined by the conditional expressions (1) and (2). With this, it is possible to achieve the wide angle of view and high optical performance, and particularly possible to satisfactorily correct a second-order spectrum of chromatic aberration of magnification at the wide angle end.

Now, the principle of correcting the chromatic aberration in one embodiment of the present invention is described. Axial chromatic aberration and chromatic aberration of magnification of the F line with respect to the C-line among the chromatic aberrations are generally called a first-order spectrum of the axial chromatic aberration and a first-order spectrum of the chromatic aberration of magnification, respectively. Further, axial chromatic aberration and chromatic aberration of magnification of the g-line with respect to the F-line that remain after the respective first-order spectrums have been corrected to zero are called a second-order spectrum of the axial chromatic aberration and a second-order spectrum of the chromatic aberration of magnification, respectively.

An axial chromatic aberration coefficient L and a magnification chromatic aberration coefficient T of the entire system of the zoom lens are provided by the following expressions (3) and (4), respectively:

$$L=\Sigma(h\_i\times h\_i\times\varphi\_i/\nu\_i) \quad (3); \text{ and}$$

$$T=\Sigma(h\_i\times h\_bar\_i\times\varphi\_i/\nu\_i) \quad (4),$$

where h_i represents a height from an optical axis of an axial ray of an i-th thin lens in paraxial ray tracing, h_bar_i represents a height from an optical axis of an off-axial ray of the i-th thin lens in the paraxial ray tracing, φ_i represents a power of the i-th thin lens in the paraxial ray tracing, and ν_i represents an Abbe number of the i-th thin lens in the paraxial ray tracing.

Further, an axial chromatic aberration amount Δf and a magnification chromatic aberration amount ΔY of the entire system of the zoom lens are provided by the following expressions (5) and (6), respectively:

$$\Delta f=-f\times L \quad (5); \text{ and}$$

$$\Delta Y=-Y\times T \quad (6),$$

where f represents a focal length of the entire system of the zoom lens, and Y represents an image height thereof.

From the expressions (3) and (4), the axial chromatic aberration is proportional to a square of the height of the axial ray, and the chromatic aberration of magnification is proportional to the product of the height of the axial ray and the height of the off-axial ray. Therefore, at a position where the off-axial ray is relatively higher than the axial ray, the axial chromatic aberration is not influenced and only the chromatic aberration of magnification can be corrected effectively.

Figure 7:
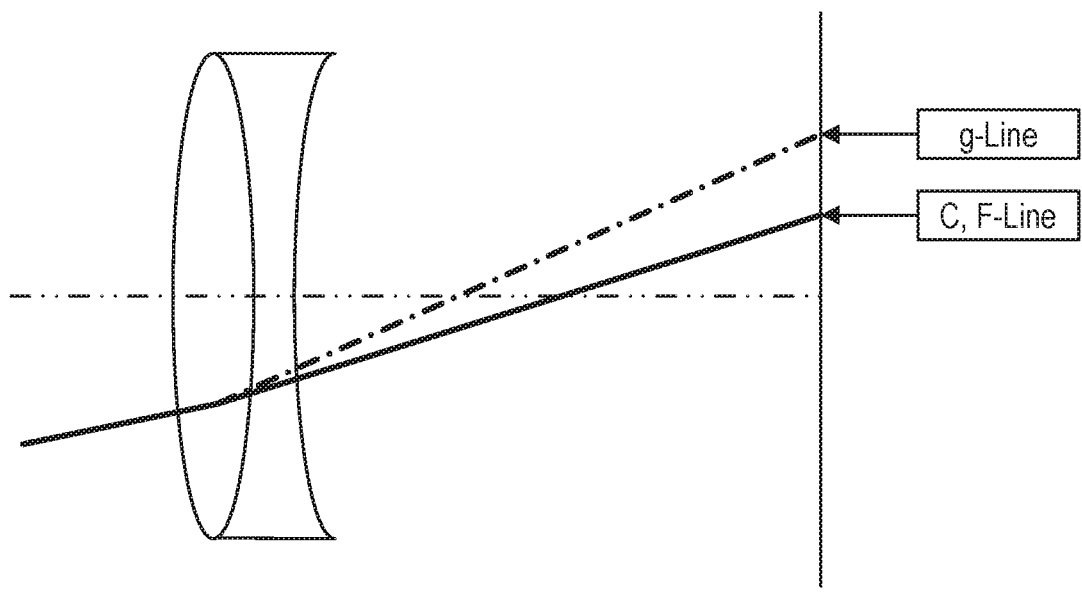
FIG. 7 is a schematic view for illustrating a principle of correcting chromatic aberration of magnification in the zoom lens according to one embodiment of the present invention.

Further, in the zoom lens having a wide angle of view, when the first-order spectrum of the chromatic aberration of magnification is made zero at the wide angle end as illustrated in FIG. 7, the second-order spectrum of the chromatic aberration of magnification tends to remain in the positive direction.

In order to correct this, at the position where the off-axial ray is relatively higher than the axial ray, a material having a large absolute value of a difference in refractive index between the g-line and the F-line is preferably used with an appropriate power for the lens having a positive refractive power. With this, it is possible to keep satisfactory balance in correcting the second-order spectrums of the axial chromatic aberration and the chromatic aberration of magnification at the wide angle end, and to satisfactorily correct the chromatic aberration in the entire zoom range.

The conditional expressions (1) and (2) define that the partial dispersion of the g-line with respect to the F-line in the optical element is larger than in a normal optical glass material.

When the obtained values of the expressions (1) and (2) fall below the lower limits thereof, the second-order spectrum in the chromatic aberration of magnification at the wide angle end is corrected insufficiently. When the obtained value of the expression (2) exceeds the upper limit thereof, the second-order spectrums in the axial chromatic aberration and the chromatic aberration of magnification at the wide angle end are corrected excessively.

It is more preferred to set the numerical ranges of the conditional expressions (1) and (2) as follows.

$$-2.100 \times 10^{-3} \times vdm + 0.713 < \theta gFm \quad (1a)$$

$$0.6 < \theta gFm < 0.8 \quad (2a)$$

As a further embodiment of the present invention, a ratio of a focal length "fn" of the optical element OE and a focal length "ff" of the rear lens unit is defined by the following conditional expression (7):

$$1.3 < |fn/ff| < 9.0 \quad (7).$$

The second-order spectrum in the chromatic aberration of magnification at the wide angle end generally remains in the positive direction. In order to correct this, it is effective to use the optical element OE made of a material having a positive refractive power and high extraordinary dispersibility near an image plane, which is a position effective in correcting the chromatic aberration of magnification in the optical system (zoom lens).

When the obtained value of the conditional expression (7) exceeds the upper limit thereof, the chromatic aberration is excessively corrected by the optical element OE to cause deterioration in axial chromatic aberration at the wide angle end. Further, the chromatic aberration of magnification at the telephoto end increases. Moreover, the thickness of the optical element OE increases, and it becomes difficult to manufacture the optical element OE.

When the obtained value of the conditional expression (7) falls below the lower limit thereof, it becomes difficult to obtain a sufficient effect of correction by the optical element OE on the second-order spectrum of the chromatic aberration of magnification at the wide angle end.

It is more preferred to set the numerical range of the conditional expression (7) as follows.

$$1.8 < |fn/ff| < 7.5 \quad (7a)$$

As a further embodiment of the present invention, a dispersion vdm of the optical element OE is defined by the following conditional expression (8):

$$13 < vdm < 35 \quad (8).$$

When the obtained value of the conditional expression (8) exceeds the upper limit thereof, dispersion of the optical element OE and that of the negative lens in the unit closest to the image side come near. Thus, the refractive power of each single unit increases, and it becomes difficult to correct various aberrations at the wide angle end. It also becomes difficult to manufacture the optical element OE with low dispersion and high extraordinary dispersibility.

When the obtained value of the conditional expression (8) falls below the lower limit thereof, dispersion of the optical element OE and that of the negative lens in the unit closest to the image side are separated from each other. Thus, it is difficult to obtain a sufficient effect of correction by the optical element OE on the second-order spectrum of the chromatic aberration of magnification at the wide angle end.

It is more preferred to set the numerical range of the conditional expression (8) as follows.

$$15 < vdm < 30 \quad (8a)$$

As a further embodiment of the present invention, it is defined by the following conditional expression (9) that the position at which the optical element OE is provided in the optical system is near the image plane:

$$0.5 < D/H < 3.0 \quad (9),$$

where D represents a distance between a thickness central position (the central position in the thickness of the optical element OE on the optical axis) and the image plane, and H represents the maximum image height of the optical system.

When the obtained value of the conditional expression (9) exceeds the upper limit thereof, the height of the axial ray passing through the optical element OE increases, and the second-order spectrum of the axial chromatic aberration is corrected excessively. When the obtained value of the conditional expression (9) falls below the lower limit thereof, a back focus appropriate as the optical system cannot be ensured, and the interference with and the mounting in the camera become difficult.

It is more preferred to set the numerical range of the conditional expression (9) as follows.

$$0.7 < D/H < 2.0 \quad (9a)$$

As a further embodiment of the present invention, it is defined that the optical element OE is cemented with a lens made of a glass material.

The optical element OE is made of a resin material, and hence the optical element OE can be stably arranged in the optical system by being cemented with the lens made of the glass material.

As a further embodiment of the present invention, it is defined that the first lens unit includes a lens unit configured to move for focusing.

Through arrangement of the lens unit configured to move for focusing in the first lens unit, an extension amount at the time of focusing can be kept constant even with any focal length from the wide angle end to the telephoto end. This enables movement of the focusing lens by a relatively simple mechanical drive mechanism and achievement of a manual focus mechanism having high followability at the time of focusing.

As a further embodiment of the present invention, it is defined by the following conditional expression (10) that the back focus of the optical system is short:

$$0.15 < BF/ID < 0.9 \quad (10),$$

where ID represents a distance from the aperture stop to the surface of the rear lens unit that is closest to the image side at the wide angle end, and BF represents a back focus.

When the obtained value of the conditional expression (10) exceeds the upper limit thereof, the back focus becomes longer, the height of the off-axial ray passing through the optical element OE decreases, and the height of the axial ray increases. Therefore, the second-order spectrum of the chromatic aberration of magnification is corrected insufficiently, and the second-order spectrum of the axial chromatic aberration is corrected excessively. It is required ensure the back focus, and hence the refractive power of the second movable unit decreases to make the size reduction difficult.

When the obtained value of the conditional expression (10) falls below the lower limit thereof, the back focus appropriate as the optical system cannot be ensured, and the interference with and the mounting in the camera become difficult.

It is more preferred to set the numerical range of the conditional expression (10) as follows.

$$0.2 < BF/ID < 0.5 \quad (10a)$$

Next, features of each of Numerical Embodiments are described.

Embodiment 1

A zoom lens according to Embodiment 1 of the present invention includes, in order from the object side to the image side: a first lens unit having a negative refractive power; second and third lens units each having a positive refractive power and configured to move for zooming; a fourth lens unit having a negative refractive power and configured to move for zooming; and a fifth lens unit (rear lens unit) having a positive refractive power for image formation. The second lens unit moves toward the object side from a wide angle end to a telephoto end.

FIG. 1 is a lens cross-sectional view of the zoom lens according to Numerical Embodiment 1 of the present invention when focusing on an object at infinity at the wide angle end.

U1 represents the first lens unit having a negative refractive power and configured not to move for zooming. A part of the first lens unit moves from the object side toward the image side for focus adjustment from the infinity to the finite length. U2 represents the second lens unit having a positive refractive power and configured to move toward the object side for zooming from the wide angle end (short focal length end) to the telephoto end (long focal length end). U3 represents the third lens unit having a positive refractive power and configured to move for zooming. SP represents an aperture stop. U4 represents the fourth lens unit having a negative refractive power and configured to move for zooming. UR represents the lens unit (rear lens unit) configured not to move for zooming. IP represents the image plane and corresponds to an imaging plane of an image pickup element (photoelectric conversion element).

In this Embodiment, the optical element OE is an optical element having a twenty-seventh surface and a twenty-eighth surface in Numerical Embodiment described later.

The optical element OE used in each Embodiment is made of resin (a resin material). The resin material is subjected to photopolymerization molding or thermal polymerization molding by using a mold. Specifically, UV curing resin (nd=1.636, vd=22.7, θgF=0.689) is used, but the resin material is not limited thereto so long as being a material satisfying the conditional expressions (1), (2), and (8).

When the optical element OE is made of the resin material, performing the photopolymerization molding or the thermal polymerization molding by using the mold leads to enhancement in manufacturing efficiency at the time of mass production.

In Table 1, values corresponding to respective conditional expressions in Numerical Embodiment 1 are shown. Numerical Embodiment 1 satisfies the conditional expressions (1), (2), and (7) to (10). Thus, the present invention achieves an image pickup optical system having a wide angle, a small size, and a light weight while achieving satisfactory optical performance.

In Table 2, optical characteristics of the optical material applied to the optical element OE of this embodiment are shown.

In FIG. 2A, there is illustrated an aberration diagram of the zoom lens according to Numerical Embodiment 1 when focusing on an object at infinity at the wide angle end, and in FIG. 2B, there is illustrated an aberration diagram of the zoom lens according to Numerical Embodiment 1 when focusing on an object at infinity at the telephoto end.

In each of the aberration diagrams, the spherical aberration is indicated by the e-line and the g-line. The astigmatism is indicated on the meridional image plane (ΔM) with respect to the e-line and on the sagittal image plane (ΔS) with respect to the e-line. The chromatic aberration of magnification is indicated by the g-line. Further, the spherical aberration, the astigmatism, the distortion, and the chromatic aberration of magnification are drawn on scales of 0.4 mm, 0.4 mm, 5%, and 0.1 mm, respectively. Symbol Fno represents the f-number, and symbol ω represents the half angle of view. The wide angle end and the telephoto end refer to the zoom positions at the time when the second lens unit U2 for zooming is located at both ends of the range in which the second lens unit U2 is mechanically movable on the optical axis. This also applies to Numerical Embodiments 2 and 3 described later.

As illustrated in the aberration diagrams of FIG. 2A and FIG. 2B, satisfactory aberration characteristics are exhibited.

Embodiment 2

FIG. 3 is a lens cross-sectional view of a zoom lens according to Embodiment 2 of the present invention when focusing on an object at infinity at a wide angle end.

In Embodiment 2, U1 represents the first lens unit having a negative refractive power and configured not to move for zooming. A part of the first lens unit moves from the object side toward the image side for focus adjustment from the infinity to the finite length. U2 represents the second lens unit having a positive refractive power and configured to move toward the object side for zooming from the wide angle end (short focal length end) to a telephoto end (long focal length end). U3 represents the third lens unit having a positive refractive power and configured to move for zooming. SP represents an aperture stop. U4 represents the fourth lens unit having a negative refractive power and configured to move for zooming. U5 represents the fifth lens unit having a positive refractive power and configured to move for zooming. UR represents the lens unit (rear lens unit) configured not to move during zooming. IP represents the image plane and corresponds to an imaging plane of an image pickup element (photoelectric conversion element).

In this Embodiment, the optical element OE is an optical element having a twenty-eighth surface and a twenty-ninth surface in Numerical Embodiment described later.

Figure 4B:
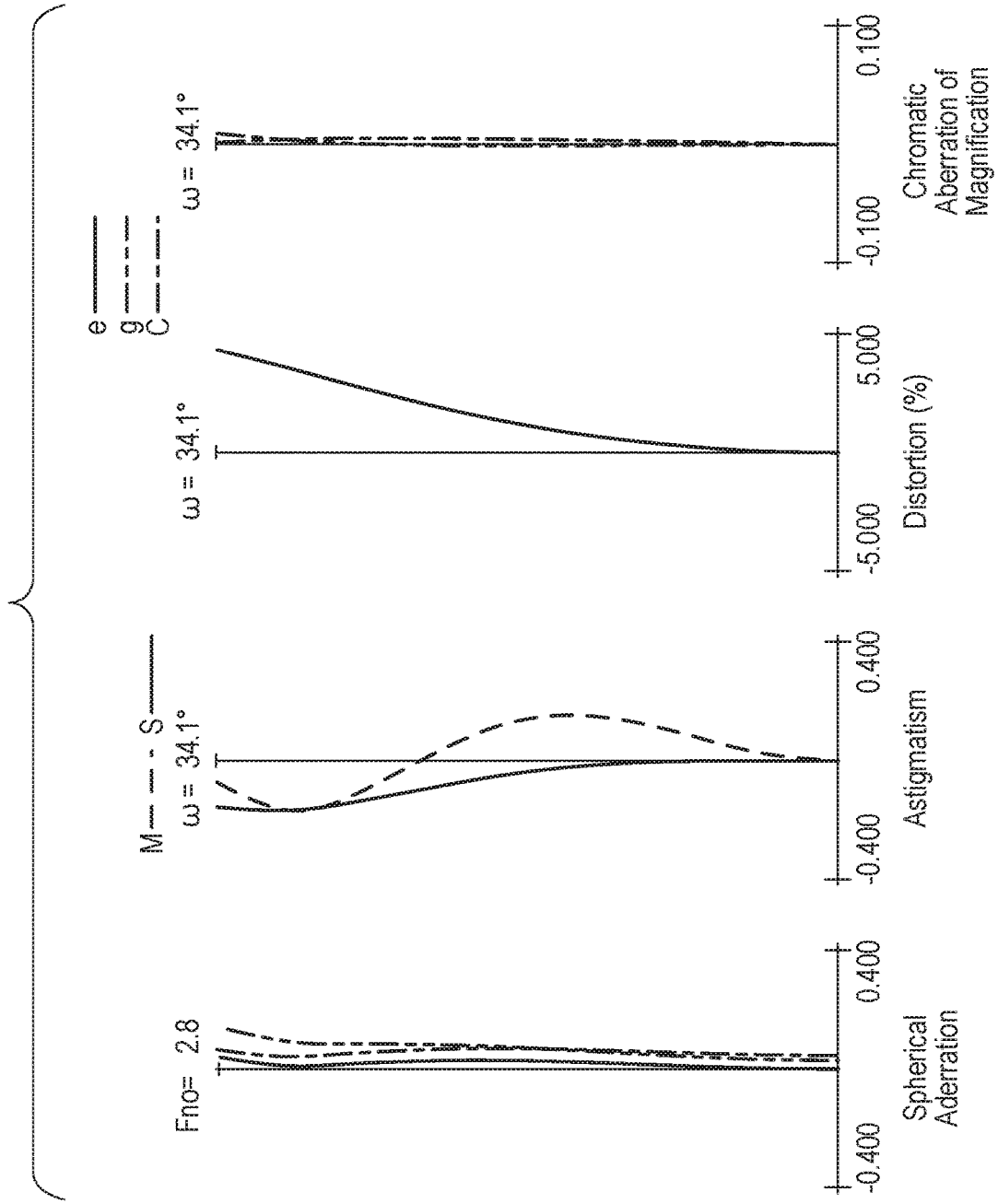
FIG. 4B is an aberration diagram of the zoom lens according to Embodiment 2 when focusing on an object at infinity at a telephoto end.

In FIG. 4A, there is illustrated an aberration diagram of the zoom lens according to Embodiment 2 when focusing on an object at infinity at the wide angle end, and in FIG. 4B, there is illustrated an aberration diagram of the zoom lens according to Embodiment 2 when focusing on an object at infinity at the telephoto end. As illustrated in the aberration diagrams of FIG. 4A and FIG. 4B, satisfactory aberration characteristics are exhibited.

In Table 1, values corresponding respective conditional expressions in Numerical Embodiment 2 are shown. Numerical Embodiment 2 satisfies the conditional expressions (1), (2), and (7) to (10). Thus, the present invention achieves an image pickup optical system having a wide angle, a small size, and a light weight while achieving satisfactory optical performance.

Embodiment 3

FIG. 5 is a lens cross-sectional view of a zoom lens according to Embodiment 3 of the present invention when focusing on an object at infinity at a wide angle end.

In Numerical Embodiment 3, U1 represents the first lens unit having a negative refractive power and configured not to move for zooming. A part of the first lens unit moves from the object side toward the image side for focus adjustment from the infinity to the finite length. U2 represents the second lens unit having a positive refractive power and configured to move toward the object side for zooming from the wide angle end (short focal length end) to a telephoto end (long focal length end). U3 represents the third lens unit having a positive refractive power and configured to move for zooming. SP represents an aperture stop. U4 represents the fourth lens unit having a negative refractive power and configured to move for zooming. UR represents the lens unit (rear lens unit) configured not to move for zooming. IP represents the image plane and corresponds to an imaging plane of an image pickup element (photoelectric conversion element).

In this Embodiment, the optical element OE is an optical element having a thirty-third surface and a thirty-fourth surface in Numeral Embodiment described later.

Figure 6A:
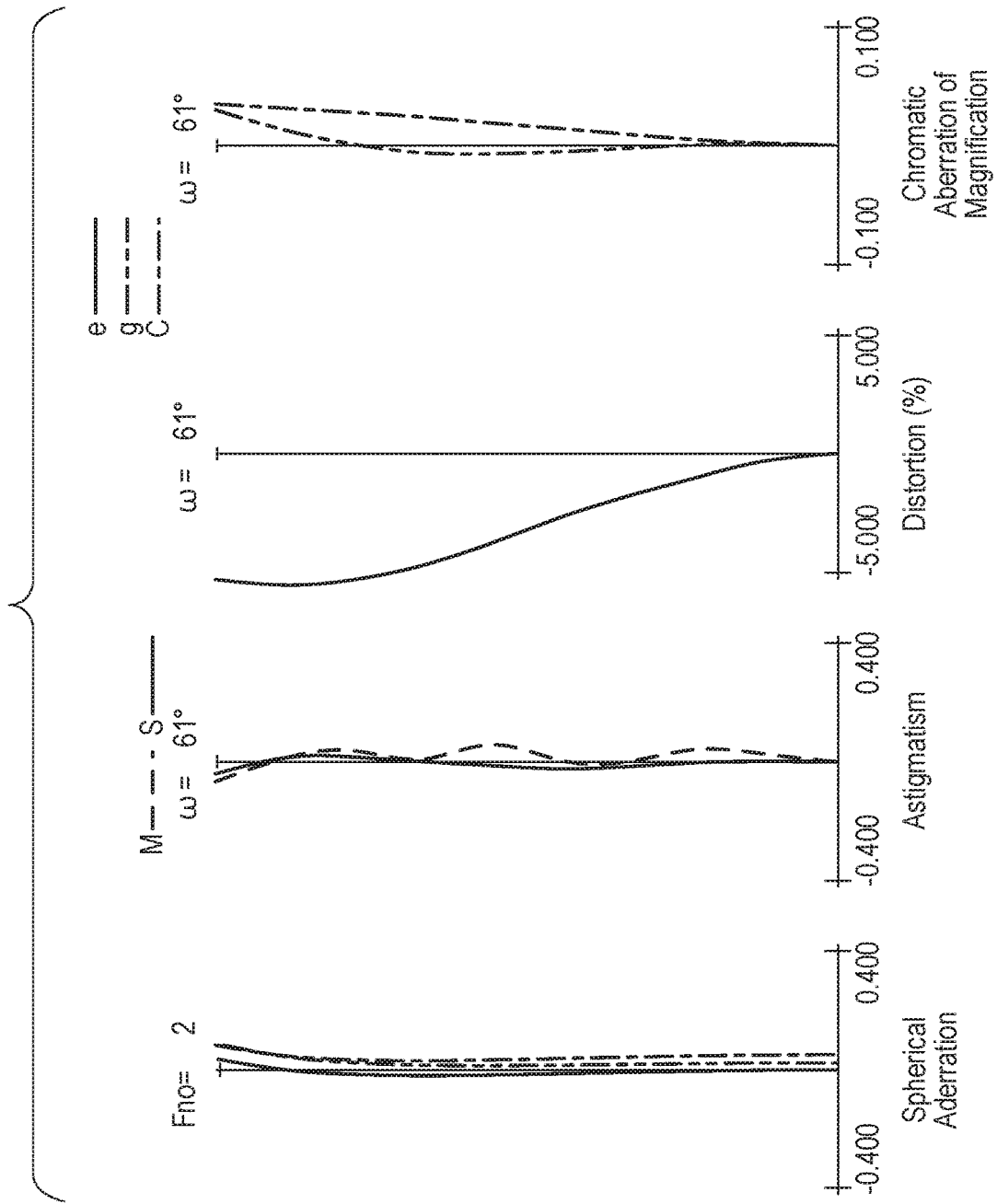
FIG. 6A is an aberration diagram of the zoom lens according to Embodiment 3 when focusing on an object at infinity at the wide angle end.

In FIG. 6A, there is illustrated an aberration diagram of the zoom lens according to Embodiment 3 when focusing on an object at infinity at the wide angle end, and in FIG. 6B, there is illustrated an aberration diagram of the zoom lens according to Embodiment 3 when focusing on an object at infinity at the telephoto end. As illustrated in the aberration diagrams of FIG. 6A and FIG. 6B, satisfactory aberration characteristics are exhibited.

In Table 1, values corresponding to respective conditional expressions in Numerical Embodiment 3 are shown. Numerical Embodiment 3 satisfies the conditional expressions (1), (2), and (7) to (10). Thus, the present invention achieves an image pickup optical system having a wide angle, a small size, and a light weight while achieving satisfactory optical performance.

Through construction of an image pickup apparatus including the zoom lens according to one embodiment of the present invention and an image pickup element configured to receive an optical image formed by the zoom lens, it is possible to achieve an image pickup apparatus capable of having the effects of the present invention.

Numerical Embodiments 1 to 3 corresponding to Embodiments 1 to 3 below are shown. In Numerical Embodiments, "r" represents a curvature radius of each surface from the object side, "d" represents an interval between each surface and the next surface, and "nd" and "vd" represent a refractive index and an Abbe number of each optical member, respectively. When refractive indices with respect to the g-line, the F-line, the d-line, and the C-line of the Fraunhofer lines are represented by Ng, NF, Nd, and NC, respectively, an Abbe number "vd" and a partial dispersion ratio "θgf" are defined by normally used definitions, and are expressed by the following expressions:

$$vd = (Nd-1)/(NF-NC); \text{ and}$$

$$\theta gf = (Ng-NF)/(NF-NC).$$

The aspherical shape is expressed by the following expression:

$$X = \frac{H^2/R}{1+\sqrt{1-(1+k)(H/R)^2}} + A4H^4 + A6H^6 +$$
$$A8H^8 + A10H^{10} + A12H^{12} + A14H^{14} + A16H^{16} + A3H^3 +$$
$$A5H^5 + A7H^7 + A9H^9 + A11H^{11} + A13H^{13} + A15H^{15}$$

where an X axis corresponds to the optical axis direction, an H axis corresponds to a direction perpendicular to the optical axis, a traveling direction of light corresponds to a positive direction, R represents a paraxial radius of curvature, k represents a conic constant, and each of A3, A4, A5, A6, A7, A8, A9, A10, A11, A12, A13, A14, A15, and A16 represents an aspherical coefficient.

In Numerical Embodiments, "e-Z" means "×10$^{-Z}$". The asterisk (*) attached to the surface number indicates that the surface is aspherical.

Numerical Embodiment 1

| | | | Unit: mm | | | | |
|---|---|---|---|---|---|---|---|
| | | | Surface data | | | | |
| Surface number | r | d | nd | vd | θgF | Effective diameter | Focal length |
| 1 | −328.76211 | 2.70000 | 1.595220 | 67.74 | 0.5442 | 85.870 | −48.159 |
| 2 | 31.62105 | 18.23965 | | | | 57.026 | |
| 3 | 73.89095 | 2.00000 | 1.816000 | 46.62 | 0.5568 | 54.917 | −55.967 |
| 4 | 27.96821 | 12.35262 | | | | 47.104 | |
| 5 | −111.85060 | 1.50000 | 1.496999 | 81.54 | 0.5375 | 47.040 | −138.009 |
| 6 | 179.48818 | 2.64364 | | | | 47.477 | |
| 7 | 107.57002 | 5.82263 | 1.800999 | 34.97 | 0.5864 | 48.451 | 131.823 |
| 8 | −8819.75101 | 3.54335 | | | | 48.244 | |
| 9 | −140.93521 | 6.85261 | 1.595220 | 67.74 | 0.5442 | 48.050 | 134.605 |
| 10 | −52.12624 | (Variable) | | | | 48.199 | |
| 11 | 47.99221 | 1.20000 | 1.854780 | 24.80 | 0.6122 | 41.654 | −137.096 |
| 12 | 33.74620 | 0.50000 | | | | 40.813 | |
| 13 | 34.99502 | 11.41871 | 1.487490 | 70.23 | 0.5300 | 41.242 | 58.158 |
| 14 | −135.75842 | (Variable) | | | | 41.484 | |
| 15 | −64.42939 | 4.66095 | 1.589130 | 61.14 | 0.5407 | 40.994 | 233.257 |
| 16 | −45.09891 | (Variable) | | | | 41.649 | |
| 17 (Stop) | ∞ | (Variable) | | | | 36.606 | |
| 18 | −40.23917 | 1.00000 | 1.834000 | 37.16 | 0.5776 | 31.656 | −46.712 |
| 19 | 1544.77445 | 4.08518 | 1.846660 | 23.78 | 0.6205 | 32.734 | 77.409 |
| 20 | −69.06608 | (Variable) | | | | 33.221 | |
| 21 | 40.28416 | 5.89079 | 1.696797 | 55.53 | 0.5434 | 34.614 | 57.771 |
| 22 | 10689.11385 | 2.91525 | | | | 34.648 | |
| 23 | 36.80889 | 1.00000 | 2.000690 | 25.46 | 0.6133 | 34.877 | −94.188 |
| 24 | 26.17716 | 7.96177 | 1.438750 | 94.66 | 0.5340 | 33.519 | 60.592 |
| 25 | 1332.94198 | 6.97850 | | | | 33.326 | |
| 26 | 49.17312 | 10.22797 | 1.438750 | 94.66 | 0.5340 | 32.101 | 46.323 |
| 27 | −32.58086 | 2.04583 | 1.635550 | 22.7 | 0.6891 | 31.033 | 116.314 |

-continued

| Unit: mm | | | | | | | |
|---|---|---|---|---|---|---|---|
| 28 | −23.24084 | 1.00000 | 2.000690 | 25.46 | 0.6133 | 31.029 | −25.722 |
| 29 | −225.30124 | 0.00000 | | | | 32.605 | |
| Image plane | ∞ | | | | | | |

Aspherical surface data

First surface

| | | |
|---|---|---|
| K = 0.00000e+000 | A4 = 7.03151e−006 | A6 = −4.83863e−009 |
| A8 = 2.96687e−012 | A10 = −1.05845e−015 | A12 = 1.79112e−019 |

Third surface

| | | |
|---|---|---|
| K = 0.00000e+000 | A4 = −1.74112e−005 | A6 = 2.10592e−008 |
| A8 = −1.24352e−011 | A10 = −6.78500e−016 | A12 = 2.89270e−018 |

Fourth surface

| | | |
|---|---|---|
| K = 0.00000e+000 | A4 = −1.57708e−005 | A6 = 1.60601e−008 |
| A8 = −1.48303e−011 | A10 = 7.51660e−015 | A12 = −1.95395e−017 |

Twenty-ninth surface

| | | |
|---|---|---|
| K = 0.00000e+000 | A4 = 9.04586e−006 | A6 = 1.18970e−009 |
| A8 = −9.87532e−012 | | |

Various data
Zoom ratio 1.45

| | Wide angle | Intermediate | Telephoto |
|---|---|---|---|
| Focal lentgh | 14.50 | 17.45 | 21.00 |
| F-number | 1.55 | 1.55 | 1.55 |
| Half angle of view | 56.17 | 51.11 | 45.85 |
| Image height | 21.64 | 21.64 | 21.64 |
| Total lens length | 191.10 | 191.10 | 191.10 |
| BF | 17.10 | 17.10 | 17.10 |
| d10 | 26.81 | 14.92 | 4.08 |
| d14 | 4.85 | 13.63 | 15.76 |
| d16 | 2.44 | 5.55 | 14.25 |
| d17 | 4.89 | 13.69 | 22.24 |
| d20 | 18.47 | 9.68 | 1.13 |
| d29 | 17.10 | 17.10 | 17.10 |
| Entrance pupil position | 27.42 | 27.91 | 28.72 |
| Exit pupil position | −51.75 | −50.47 | −47.48 |
| Front principal point position | 38.87 | 40.85 | 42.89 |
| Rear principal point position | 2.60 | −0.35 | −3.90 |

Zoom lens unit data

| Unit | First surface | Focal length | Lens structure length | Front principal point position | Rear principal point position |
|---|---|---|---|---|---|
| 1 | 1 | −42.68 | 55.65 | −4.17 | −72.72 |
| 2 | 11 | 100.35 | 13.12 | 3.15 | −5.85 |
| 3 | 15 | 233.26 | 4.66 | 8.96 | 6.27 |
| 4 | 18 | −128.88 | 5.09 | −4.38 | −7.38 |
| 5 | 21 | 46.97 | 38.02 | −11.82 | −30.70 |

Single lens data

| Lens | First surface | Focal length |
|---|---|---|
| 1 | 1 | −48.16 |
| 2 | 3 | −55.97 |
| 3 | 5 | −138.01 |
| 4 | 7 | 131.82 |
| 5 | 9 | 134.60 |
| 6 | 11 | −137.10 |
| 7 | 13 | 58.16 |
| 8 | 15 | 233.26 |
| 9 | 18 | −46.71 |
| 10 | 19 | 77.41 |
| 11 | 21 | 57.77 |
| 12 | 23 | −94.19 |

-continued

| | | | Unit: mm | |
|---|---|---|---|---|
| 13 | | 24 | | 60.59 |
| 14 | | 26 | | 46.32 |
| 15 | | 27 | | 116.31 |
| 16 | | 28 | | −25.72 |

Numerical Embodiment 2

| | | Unit: mm | | | | |
|---|---|---|---|---|---|---|
| | | Surface data | | | | |
| Surface number | r | d | nd | vd | θgF | Effective diameter | Focal length |
| 1 | 133.22451 | 2.50000 | 1.595220 | 67.74 | 0.5442 | 71.458 | −55.161 |
| 2 | 26.23031 | 15.59077 | | | | 49.761 | |
| 3 | 67.30286 | 2.00000 | 1.816000 | 46.62 | 0.5568 | 48.052 | −67.744 |
| 4 | 30.02809 | 10.56443 | | | | 40.941 | |
| 5 | −109.83474 | 1.20000 | 1.595220 | 67.74 | 0.5442 | 40.624 | −88.238 |
| 6 | 101.74456 | 0.16252 | | | | 39.778 | |
| 7 | 51.05276 | 5.02058 | 1.625882 | 35.70 | 0.5893 | 39.711 | 161.793 |
| 8 | 98.38938 | 5.84016 | | | | 38.722 | |
| 9 | −77.58311 | 4.11418 | 1.496999 | 81.54 | 0.5375 | 38.269 | 182.442 |
| 10 | −42.60446 | (Variable) | | | | 38.221 | |
| 11 | 120.28471 | 1.44000 | 1.806098 | 40.92 | 0.5701 | 28.802 | −53.749 |
| 12 | 31.81744 | 7.11921 | 1.496999 | 81.54 | 0.5375 | 29.303 | 47.226 |
| 13 | −83.75108 | 0.20000 | | | | 30.143 | |
| 14 | 52.70169 | 3.20000 | 1.595220 | 67.74 | 0.5442 | 31.727 | 109.382 |
| 15 | 266.35847 | (Variable) | | | | 31.726 | |
| 16 | −127.44698 | 4.21522 | 1.595220 | 67.74 | 0.5442 | 32.546 | 105.292 |
| 17 | −42.63226 | (Variable) | | | | 32.822 | |
| 18 (Stop) | ∞ | (Variable) | | | | 26.708 | |
| 19 | −41.69089 | 0.80000 | 1.834807 | 42.71 | 0.5642 | 21.905 | −32.525 |
| 20 | 79.80707 | 3.50459 | 1.854780 | 24.80 | 0.6122 | 23.493 | 56.535 |
| 21 | −122.94532 | (Variable) | | | | 24.497 | |
| 22 | 77.10295 | 4.68162 | 1.595220 | 67.74 | 0.5442 | 29.899 | 73.273 |
| 23 | −98.92987 | 3.31863 | | | | 30.487 | |
| 24 | 38.50309 | 0.80000 | 2.001000 | 29.13 | 0.5997 | 32.729 | −87.889 |
| 25 | 26.56759 | 8.80587 | 1.496999 | 81.54 | 0.5375 | 31.908 | 42.048 |
| 26 | −88.33354 | (Variable) | | | | 32.000 | |
| 27 | −269.56283 | 7.06276 | 1.496999 | 81.54 | 0.5375 | 30.606 | 52.354 |
| 28 | −24.00000 | 0.99631 | 1.635550 | 22.7 | 0.6891 | 30.526 | 384.310 |
| 29 | −22.22748 | 0.80000 | 2.003300 | 28.27 | 0.5980 | 30.567 | −27.474 |
| 30 | −112.97976 | 0.00000 | | | | 32.872 | |
| Image plane | ∞ | | | | | | |

Aspherical surface data

First surface

K = 0.00000e+000   A4 = 5.44815e−006   A6 = −2.12101e−009
A8 = 1.09995e−012

Third surface

K = 0.00000e+000   A4 = −3.83455e−006   A6 = −9.65453e−011
A8 = 1.57577e−012

Thirtieth surface

K = 0.00000e+000   A4 = 2.29270e−006   A6 = −9.74945e−009

Various data
Zoom ratio 2.00

| | Wide angle | Intermediate | Telephoto |
|---|---|---|---|
| Focal length | 16.00 | 22.62 | 32.00 |
| F-number | 2.80 | 2.80 | 2.80 |
| Half angle of view | 53.52 | 43.72 | 34.06 |
| Image height | 21.64 | 21.64 | 21.64 |
| Total lens length | 190.58 | 190.58 | 190.58 |
| BF | 21.35 | 21.35 | 21.35 |
| d10 | 31.50 | 16.25 | 4.69 |
| d15 | 3.02 | 11.79 | 13.24 |

-continued

| Unit: mm | | | |
|---|---|---|---|
| d17 | 1.71 | 8.20 | 18.31 |
| d18 | 2.61 | 13.65 | 30.45 |
| d21 | 25.43 | 15.49 | 1.14 |
| d26 | 11.01 | 9.90 | 7.47 |
| d30 | 21.35 | 21.35 | 21.35 |
| Entrance pupil position | 28.28 | 28.89 | 30.15 |
| Exit pupil position | −54.99 | −53.93 | −47.21 |
| Front principal point position | 40.92 | 44.71 | 47.21 |
| Rear principal point position | 5.35 | −1.27 | −10.65 |

| Zoom lens unit data | | | | | |
|---|---|---|---|---|---|
| Unit | First surface | Focal length | Lens structure length | Front principal point position | Rear principal point position |
| 1 | 1 | −29.33 | 46.99 | 6.48 | −37.24 |
| 2 | 11 | 81.87 | 11.96 | 6.05 | −1.68 |
| 3 | 16 | 105.29 | 4.22 | 3.89 | 1.30 |
| 4 | 19 | −80.02 | 4.30 | −1.31 | −3.69 |
| 5 | 22 | 40.09 | 17.61 | 4.92 | −8.15 |
| 6 | 27 | −64.20 | 8.86 | 4.19 | −1.50 |

| Single lens data | | |
|---|---|---|
| Lens | First surface | Focal length |
| 1 | 1 | −55.16 |
| 2 | 3 | −67.74 |
| 3 | 5 | −88.24 |
| 4 | 7 | 161.79 |
| 5 | 9 | 182.44 |
| 6 | 11 | −53.75 |
| 7 | 12 | 47.23 |
| 8 | 14 | 109.38 |
| 9 | 16 | 105.29 |
| 10 | 19 | −32.52 |
| 11 | 20 | 56.53 |
| 12 | 22 | 73.27 |
| 13 | 24 | −87.89 |
| 14 | 25 | 42.05 |
| 15 | 27 | 52.35 |
| 16 | 28 | 384.31 |
| 17 | 29 | −27.47 |

Numerical Embodiment 3

| Unit: mm | | | | | | |
|---|---|---|---|---|---|---|
| Surface data | | | | | | |
| Surface number | r | d | nd | vd | θgF | Effective diameter | Focal length |
| 1 | 0.00000 | 2.70000 | 1.595220 | 67.74 | 0.5442 | 86.215 | |
| 2 | 30.46386 | 17.62600 | | | | 55.489 | |
| 3 | 244.55963 | 2.00000 | 1.816000 | 46.62 | 0.5568 | 53.571 | −46.954 |
| 4 | 33.14837 | 9.06594 | | | | 45.210 | |
| 5 | 559.87152 | 2.00000 | 1.496999 | 81.54 | 0.5375 | 45.102 | −87.215 |
| 6 | 40.29232 | 3.91441 | | | | 44.066 | |
| 7 | 51.38407 | 1.80000 | 1.816000 | 46.62 | 0.5568 | 44.575 | −234.775 |
| 8 | 39.92014 | 3.99324 | | | | 43.492 | |
| 9 | 55.48024 | 6.33207 | 1.800999 | 34.97 | 0.5864 | 44.512 | 73.744 |
| 10 | 785.05240 | 3.63172 | | | | 44.210 | |
| 11 | −133.20771 | 5.39293 | 1.496999 | 81.54 | 0.5375 | 43.863 | 190.153 |
| 12 | −56.12446 | (Variable) | | | | 43.751 | |
| 13 | 42.25673 | 1.80000 | 1.800999 | 34.97 | 0.5864 | 39.819 | −110.420 |
| 14 | 28.11236 | 10.51126 | 1.487490 | 70.23 | 0.5300 | 37.617 | 48.175 |
| 15 | −127.77929 | (Variable) | | | | 37.007 | |

-continued

| Unit: mm | | | | | | | |
|---|---|---|---|---|---|---|---|
| 16 | 135.91498 | 1.00000 | 1.850259 | 32.27 | 0.5929 | 31.407 | −60.760 |
| 17 | 37.50395 | 3.71294 | 1.516330 | 64.14 | 0.5353 | 30.915 | 180.635 |
| 18 | 60.45702 | 0.83750 | | | | 30.972 | |
| 19 | 72.51481 | 5.00000 | 1.589130 | 61.14 | 0.5407 | 31.136 | 52.415 |
| 20 | −52.76002 | (Variable) | | | | 31.167 | |
| 21 (Stop) | ∞ | (Variable) | | | | 27.992 | |
| 22 | −45.27484 | 1.00000 | 1.834807 | 42.71 | 0.5642 | 23.395 | −24.711 |
| 23 | 38.66929 | 3.90542 | 1.854780 | 24.80 | 0.6122 | 23.676 | 46.286 |
| 24 | 1158.21022 | 0.20000 | | | | 24.782 | |
| 25 | 42.87954 | 3.50000 | 1.654115 | 39.68 | 0.5737 | 27.393 | 96.653 |
| 26 | 127.35130 | (Variable) | | | | 27.942 | |
| 27 | 26.52844 | 5.43604 | 1.696797 | 55.53 | 0.5434 | 31.269 | 54.755 |
| 28 | 78.95291 | 0.12473 | | | | 30.756 | |
| 29 | 30.56091 | 1.00000 | 2.001000 | 29.13 | 0.5997 | 30.248 | −44.765 |
| 30 | 17.92908 | 7.64128 | 1.496999 | 81.54 | 0.5375 | 27.885 | 42.412 |
| 31 | 101.29604 | 7.44801 | | | | 27.618 | |
| 32 | 449.61588 | 6.85974 | 1.438750 | 94.66 | 0.5340 | 27.150 | 47.631 |
| 33 | −21.87256 | 0.99879 | 1.635550 | 22.7 | 0.6891 | 27.017 | 295.795 |
| 34 | −19.96375 | 1.00000 | 2.003300 | 28.27 | 0.5980 | 27.068 | −35.763 |
| 35 | −45.66119 | 0.00000 | | | | 29.170 | |
| Image plane | ∞ | | | | | | |

Aspherical surface data

First surface

| K = 0.00000e+000 | A4 = 5.41585e−006 | A6 = −4.12114e−009 |
|---|---|---|
| A8 = 2.67070e−012 | A10 = −9.63497e−016 | A12 = 1.60310e−019 |

Third surface

| K = 0.00000e+000 | A4 = 3.04959e−006 | A6 = −7.51793e−009 |
|---|---|---|
| A8 = 3.39487e−012 | | |

Sixth surface

| K = 0.00000e+000 | A4 = 3.61895e−006 | A6 = −1.88641e−008 |
|---|---|---|
| A8 = 7.36003e−012 | | |

Thirty-fifth surface

| K = 0.00000e+000 | A4 = 2.17151e−005 | A6 = 1.38592e−008 |
|---|---|---|

Various data
Zoom ratio 1.67

| | Wide angle | Intermediate | Telephoto |
|---|---|---|---|
| Focal lentgh | 12.00 | 15.49 | 20.00 |
| F-number | 2.00 | 2.00 | 2.00 |
| Half angle of view | 60.98 | 54.40 | 47.25 |
| Image height | 21.64 | 21.64 | 21.64 |
| Total lens length | 203.91 | 203.91 | 203.91 |
| BF | 14.88 | 14.88 | 14.88 |
| d12 | 42.88 | 23.23 | 4.21 |
| d15 | 1.41 | 20.57 | 34.32 |
| d20 | 1.63 | 2.11 | 7.38 |
| d21 | 4.98 | 11.78 | 21.70 |
| d26 | 17.71 | 10.91 | 0.99 |
| d35 | 14.88 | 14.88 | 14.88 |
| Entrance pupil position | 27.06 | 27.82 | 29.41 |
| Exit pupil position | −54.96 | −53.66 | −49.84 |
| Front principal point position | 37.00 | 39.81 | 43.23 |
| Rear principal point position | 2.88 | −0.61 | −5.12 |

Zoom lens unit data

| Unit | First surface | Focal length | Lens structure length | Front principal point position | Rear principal point position |
|---|---|---|---|---|---|
| 1 | 1 | −32.43 | 58.46 | 1.08 | −66.05 |
| 2 | 13 | 86.57 | 12.31 | 1.72 | −6.54 |
| 3 | 16 | 118.61 | 10.55 | 9.42 | 2.63 |

-continued

Unit: mm

| | | | | | |
|---|---|---|---|---|---|
| 4 | 22 | −124.45 | 8.61 | −2.09 | −7.07 |
| 5 | 27 | 59.40 | 30.51 | −9.27 | −28.44 |

Single lens data

| Lens | First surface | Focal length |
|---|---|---|
| 1 | 1 | −51.00 |
| 2 | 3 | −46.95 |
| 3 | 5 | −87.21 |
| 4 | 7 | −234.78 |
| 5 | 9 | 73.74 |
| 6 | 11 | 190.15 |
| 7 | 13 | −110.42 |
| 8 | 14 | 48.18 |
| 9 | 16 | −60.76 |
| 10 | 17 | 180.63 |
| 11 | 19 | 52.41 |
| 12 | 22 | −24.71 |
| 13 | 23 | 46.29 |
| 14 | 25 | 96.65 |
| 15 | 27 | 54.76 |
| 16 | 29 | −44.76 |
| 17 | 30 | 42.41 |
| 18 | 32 | 47.63 |
| 19 | 33 | 295.80 |
| 20 | 34 | −35.76 |

TABLE 1

Values corresponding to respective conditional expressions in Numerical Embodiments 1 to 3

| | Embodiment | | |
|---|---|---|---|
| Conditional Expression | 1 | 2 | 3 |
| (1) $-2.100e-3 \times vdm + 0.693 < \theta gFm$ | $0.645 < 0.689$ | $0.645 < 0.689$ | $0.645 < 0.689$ |
| (2) $\theta gFm$ | 0.689 | 0.689 | 0.689 |
| (7) $|\varphi n/\varphi f|$ | 2.48 | 5.99 | 4.98 |
| (8) $vdm$ | 22.7 | 22.7 | 22.7 |
| (9) D/H | 1.27 | 1.01 | 1.45 |
| (10) BF/ID | 0.26 | 0.31 | 0.24 |

TABLE 2

Characteristics of optical material

| | Optical material |
|---|---|
| d-line refractive index | 1.63555 |
| g-line refractive index | 1.67532 |
| C-line refractive index | 1.62807 |
| F-line refractive index | 1.65604 |
| vd | 22.7 |
| θgF | 0.689 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-091070, filed May 1, 2017, which is hereby incorporated by reference herein in its entirety.

What is claimed is:

1. A zoom lens comprising in order from an object side to an image side:

a first lens unit having a negative refractive power and configured not to move for zooming;

a second lens unit having a positive refractive power and configured to move to an object side for zooming from a wide angle end to a telephoto end; and a rear lens unit arranged closest to the image side, wherein the rear lens unit includes an optical element having a positive refractive power and cemented with a lens made of a glass material, and wherein the optical element satisfies the following conditions:

$-2.100 \times 10^{-3} \times vdm + 0.693 < \theta gFm$; and $0.555 < \theta gFm < 0.900$, where vdm and θgFm are expressed by the following expressions:

$vdm = (Nd-1)/(NF-NC)$; and $\theta gFm = (Ng-NF)/(NF-NC)$, where Ng, NF, Nd and NC respectively represent refractive indices with respect to a g-line, an F-line, a d-line, and C-line.

2. The zoom lens according to claim 1, wherein the following condition is satisfied:

$1.3 < |fn/ff| < 9.0$, where fn represents a focal length of the optical element, and ff represents a focal length of the rear lens unit.

3. The zoom lens according to claim 1, wherein the following condition is satisfied:

$13 < vdm < 35$.

4. The zoom lens according to claim 1, wherein the rear lens unit is configured not to move for zooming, and the following condition is satisfied:

$0.5 < D/H < 3.0$, where D represents a distance between a central position in a thickness of the optical element on an optical axis and an image plane, and H represents a maximum image height of an optical system.

5. The zoom lens according to claim 1, wherein the rear lens unit is configured not to move for zooming.

6. The zoom lens according to claim 1, wherein the first lens unit includes a sub lens unit configured to move for focus adjustment.

7. The zoom lens according to claim 1, further comprising an aperture stop, wherein the following condition is satisfied:

$$0.15 < BF/ID < 0.9,$$

where ID represents a distance from the aperture stop to a surface of the rear lens unit that is closest to the image side at the wide angle end, and BF represents a back focus.

8. An image pickup apparatus comprising:
a zoom lens comprising in order from an object side to an image side:
  a first lens unit having a negative refractive power and configured not to move for zooming;
  a second lens unit having a positive refractive power and configured to move to an object side for zooming from a wide angle end to a telephoto end; and
  a rear lens unit arranged closest to the image side,
wherein the rear lens unit includes an optical element having a positive refractive power and cemented with a lens made of a glass material, and
wherein the optical element satisfies the following conditions:

$$-2.100 \times 10^{-3} \times vdm + 0.693 < \theta gFm; \text{ and}$$

$$0.555 < \theta gFm < 0.900,$$

where $vdm$ and $\theta gFm$ are expressed by the following expressions:

$$vdm = (Nd-1)/(NF-NC); \text{ and}$$

$$\theta gFm = (Ng-NF)/(NF-NC),$$

where Ng, NF, Nd and NC respectively represent refractive indices with respect to a g-line, an F-line, a d-line, and C-line and
an image pickup element configured to receive an optical image formed by the zoom lens.

* * * * *